June 17, 1958  D. W. SHEPHERD  2,838,805
SILOS AND LIKE STORAGE CONTAINERS
Filed June 1, 1954  5 Sheets-Sheet 1

Inventor:-
Donald Welton Shepherd,
By Pierce, Scheffler + Parker,
Attorneys.

June 17, 1958 D. W. SHEPHERD 2,838,805
SILOS AND LIKE STORAGE CONTAINERS
Filed June 1, 1954 5 Sheets-Sheet 2

Inventor:-
Donald Welton Shepherd,
By Pierce, Scheffler & Parker,
Attorneys.

June 17, 1958    D. W. SHEPHERD    2,838,805
SILOS AND LIKE STORAGE CONTAINERS
Filed June 1, 1954    5 Sheets-Sheet 3

Inventor:-
Donald Welton Shepherd,
By Pierce, Scheffler + Parker,
Attorneys.

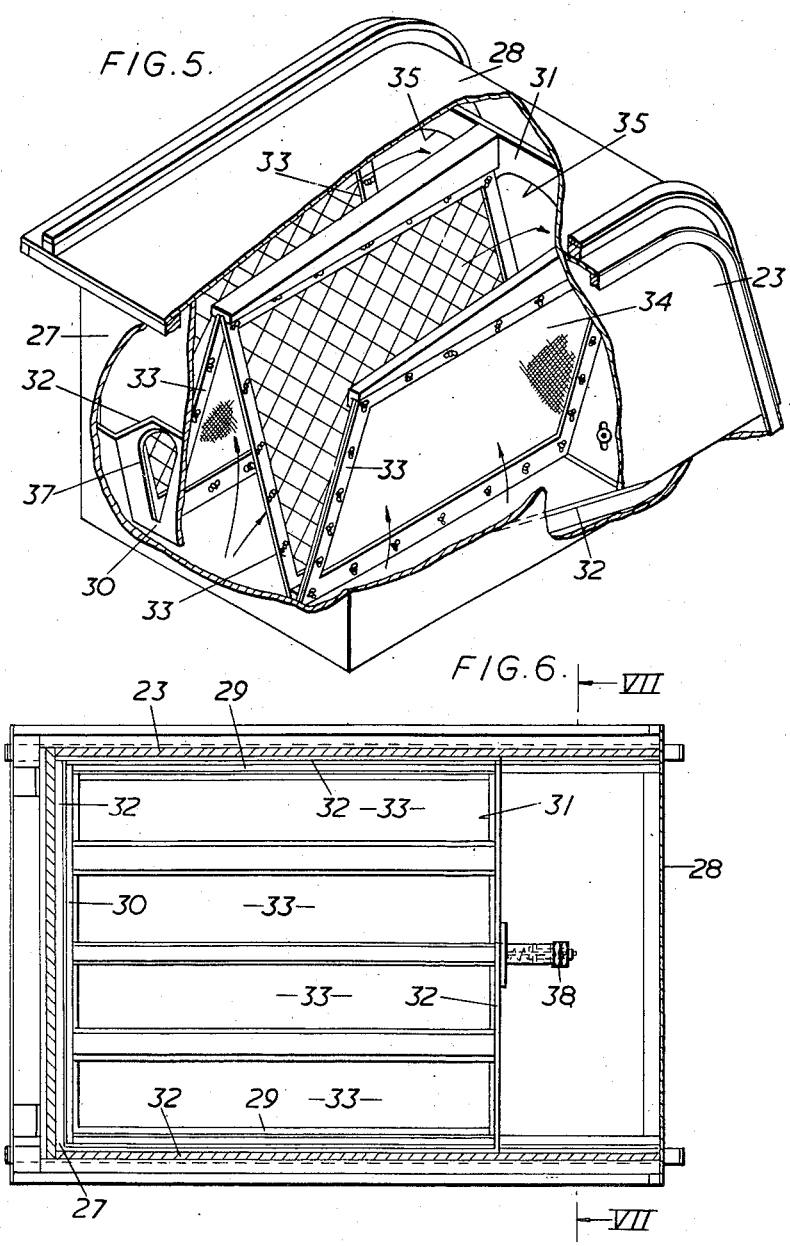

June 17, 1958   D. W. SHEPHERD   2,838,805
SILOS AND LIKE STORAGE CONTAINERS
Filed June 1, 1954   5 Sheets-Sheet 5

United States Patent Office 2,838,805
Patented June 17, 1958

2,838,805

SILOS AND LIKE STORAGE CONTAINERS

Donald Welton Shepherd, York, England, assignor to Portasilo Limited, York, England, a British company Application June 1, 1954, Serial No. 433,749

Claims priority, application Great Britain June 1, 1953

9 Claims. (Cl. 20—1.4)

This invention is concerned with improvements in or relating to silos and like storage containers, hereinafter referred to in general as "silos," and has for one of its objects to provide a silo which is of a readily transportable nature even though it be capable of storing large amounts of material, e. g. of the order of ten tons or more.

Whilst silos in accordance with the present invention may be utilised for the storage of a wide variety of materials such for instance as cement or grain, they are particularly intended for use in the storage of cement, on or near to a site where such cement is required for use. It may be mentioned in this respect that very considerable costs and labour are involved in transporting cement to a building site and handling such cement at such site by the procedure at present practised, and it is a further object of the present invention to provide equipment with the aid of which such costs and labour can be very greatly reduced.

The present practice is to bag cement, usually in hundredweight bags, and those bags after being filled have to be loaded onto a lorry for transport to the required site, and on arrival there is further handling for the purpose of unloading the lorries. The bags then have to be handled again whilst their contents are tipped into a mixer or into some local means of transport and finally there has to be disposal of the emptied bags. Difficulties are also experienced if for instance only a part of a bag is required to make up a given quantity of cement as this involves further handling. Moreover, any filled or partially filled bags not required for more or less immediate use have to be placed under cover otherwise there is a danger of the contents being ruined by exposure. With the aid of equipment in accordance with the present invention all of these difficulties are entirely removed or very greatly minimised.

According to the present invention there is provided a transportable silo comprising a plurality of cylindrical components made principally from light-weight material such as plywood and secured together in coaxial relationship, in combination with a reinforcing keel extending along the assembled cylindrical components, the said reinforcing keel serving as a base on which the silo can rest when positioned horizontally for instance for transport purposes.

In order to enable access to be had to the top of the silo when such silo is in its erected position a ladder may be provided, such ladder preferably being integral with the silo and advantageously being embodied in the structure of the above-mentioned keel.

The aforesaid silo preferably includes a movable or removable top portion disposed for covering the whole or a part of the top of the silo, access to such cover being readily attainable by anybody climbing the above-mentioned ladder.

The aforesaid silo also preferably includes a bottom component in the form of a downwardly convergent truncated cone terminating in an aperture through which the contents of the silo may be discharged, such aperture being provided with any desired valve for enabling it to be opened and closed at will.

The aforesaid discharge aperture must of course be spaced above the base of the silo by a distance appropriate for enabling a wheelbarrow or other container for the discharged material to be located thereunder, and the silo is accordingly provided with a base unit preferably comprising a series of frames disposed in planes radial to the aforesaid conical component, and extending from rings secured to the said conical component, there being for instance two such rings, one at or near the upper periphery of the conical component and the other about mid-way along such component. Each of the said frames may comprise a member extending vertically from the said upper ring to the base of the silo structure, a member extending downwardly from the lower ring to the base of the silo, a strut extending between the said rings and lying against the face of the conical component and a strut extending horizontally and radially between the lower ends of said members. In such an arrangement the lower horizontal struts of the respective frames may be tied by ring-like elements, and plywood or other light-weight sheeting may be fitted to the outer frame members to form a cylindrical outer shell, and to the inner supporting members.

The aforesaid arrangement whereby the space below the discharge aperture is shielded is of advantage in that material being fed from the silo into the collector is protected against being blown about by any wind.

The aforesaid cylindrical components are butted against one another and the joints are preferably covered by plates or flashing for instance of laminated timber which are in turn embraced by reinforcing and load-distributing rings preferably made in accordance with the invention forming the subject of copending patent application No. 431,948, filed May 24, 1954, e. g. rings comprising laminations composed of arcuate elements of plywood and laminations composed of arcuate elements of wood disposed and secured together so that the joints between adjacent elements in one layer are overlapped by the element or elements in the adjacent layer or layers.

If desired the aforesaid rings constittuing parts of the base support for the silo can also be of a laminated nature similar to that of the upper reinforcing and load-distributing rings, such rings preferably being provided on their upper and lower surfaces with linings consisting of sheets of aluminum or other material of a protective nature.

The keel of a silo in accordance with the present invention preferably extends the full length of the silo and may for instance comprise two longitudinal members made from timber of 1" (2.5 cms.) thickness, such members being secured to the silo shell and rungs may extend therebetween to form a ladder. It is at present preferred however to secure a facing sheet of plywood to said longitudinally extending members and to cut footholds in said facing sheet to form such ladder. In cases where the keel is made from wood the forward edges of such keel and the tread-forming parts of the ladder may be metal-shod in order to avoid undue wear.

The lower end of the aforesaid keel, i. e. the end adjacent to the base of the erected silo is preferably rounded and if made from wood it is advantageously shod with metal so as to form a suitable heel about which the silo can be swung when it is being turned from its vertical position to its horizontal position and vice versa.

In order to facilitate man-handling of the silo, ropes, bars, tubes or the like extending longitudinally along the silo may be provided.

A silo in accordance with the present invention may be loaded with the aid of any suitable conveyor or the like but in the case for instance, of cement, it is preferred that it should be loaded by transferring such cement from a storage container by means of air pressure. Thus for instance a silo on a building site may be periodically charged by blowing cement into such silo from a container on a lorry or trailer, i. e. the cement can be transported to the site in bulk and transferred with very little labour into the silo for subsequent withdrawal as and when required. In such cases it will be appreciated that there must be provision for the cement to be blown into the silo and for air to escape from the silo. It is accordingly preferred to incorporate a supply duct in the silo structure, and a ventilator in the top of the silo.

The aforesaid supply duct preferably has an inlet union near the base of the silo for connection to a delivery hose from the container from which the cement or other material is to be transferred and the duct from such inlet union may then extend through the silo shell up to the top of the silo or it may extend upwardly on the outside of the shell and then be in-turned into the silo. The latter arrangement is at present preferred and in such cases the vertical part of the duct may be embodied in the aforesaid keel and ladder structure. Thus for instance assuming that as above-mentioned the keel and ladder structure comprises two spaced and longitudinally extending members and an interconnecting sheet having footholds cut therein, the duct may be formed by wooden members secured to the above-mentioned reinforcing rings and forming a rectangular duct. In an alternative arrangement an independent duct may be housed in the space between the main members of the keel and in that case the duct may be in the form of a hose or pipe.

The aforesaid duct may have an integral and in-turned upper section leading say to about the axial centre line of the silo, or such upper section may be removably fitted.

The aforesaid ventilator may be of any suitable form but we prefer that this should be in the form of a hinged cowling unit extending to a point at or adjacent to the head of the keel of the silo so that access can be had to such unit without having to crawl across the roof of such silo, it being understood that in this respect that it is desirable to afford easy inspection of the interior of the silo for the purpose of checking the amount of any material therein.

The aforesaid cowling unit, which may be made from laminations, including a plywood lamination, a soft wood lamination and an outer sheet metal lamination, is provided with depending filter frames which may be somewhat of truncated pyramidical form, such frames being covered with filter cloths preferably backed with wire mesh or other reinforcing material, the V-disposition of the filter frames being adopted so as to secure the maximum filter area with compact overall dimensions.

When the aforesaid cowling unit is closed and the silo is being charged say with cement, by means of air under pressure, the air entering the silo may escape through the filter cloths into the centre of the pyramidical ventilator unit and thence through the front of the ventilator unit into the curved forward part of the cowling and out through the upper end of the keel structure. This arrangement has the advantages that on the one hand there is protection against wind-driven rain entering the interior of the silo and on the other hand a loader is afforded visual evidence of any attempt to overload the silo particularly in the case where the silo is being charged with cement or other powdery material as clouds of finely divided particles will then emerge from the ventilator pursuant to any attempt to blow further material into an already charged silo.

If desired rubber sealing strips or the like may be located around those parts of the silo structure against which the aforesaid cowling unit abuts when it is in its closed position so that the only exit from such silo is through the ventilator.

The aforesaid cowling unit may be associated with any suitable means for securing it in a closed or opened condition. Thus for instance, cooperating fastener parts may be fitted to the roof of the silo and to the cowling unit respectively, for securing such unit in a closed condition, and an extending strut may be provided for holding such unit in an opened condition.

It is preferred that the internal surfaces of the aforesaid silo should be free from any ledge-forming projections on which material charged into such silo may collect and if therefore it is desired to provide any internal reinforcement this preferably takes the form of longitudinally extending stiffener ribs.

The aforesaid opening in the base section of the silo is preferably of a width not greater than that necessary for enabling a collector to be easily moved into position under the discharge aperture so that the base support extends around the silo to an extent affording appropriate rigidity thereto. We find for instance that in some cases it is appropriate for the angle subtended by such opening to be about 90°.

The aforesaid discharge aperture of a silo in accordance with the present invention may be provided with any suitable valve and in some cases such valve may be actuated automatically by the passage of a collector thereunder. In a further arrangement the closure of the said valve may be effected automatically upon delivery of a predetermined amount of material into the collector. Thus for instance a collector in the form of a wheelbarrow, or in the form of a truck mounted on rails, may move on to a movable platform located under the discharge aperture, such platform being maintained in an elevated position by a weight representing the required weight of material to be discharged into such collector. When therefore the predetermined amount of material has been fed into the collector the platform will move to a lower position and such movement can bring about the closing of the said valve through any suitable linkage or other transmission means. If in such arrangement the opening of the valve is effected by the positioning of a collector under the discharge aperture then the whole operation of collecting a predetermined amount of material is effected by the mere operation of locating the collector in the receiving position.

If desired means may be incorporated in a silo according to the present invention for promoting the smooth flow of material through the discharge aperture of such silo, it being desirable in some cases to adopt precautions for preventing the arching which sometimes tends to become established when feeding certain powdery or granular materials.

A silo in accordance with the present invention may be of any desired capacity and dimensions, and purely by way of example, it may be mentioned that we have found that for a silo adapted for holding ten tons of cement such silo can conveniently be sixteen feet (4.88 m.) in height and six feet (1.83 m.) in diameter, and be composed of three main sections, namely a base support section incorporating the above-mentioned conical delivery component of the silo proper, such section being say 6'9" (2.05 m.) in height, an intermediate cylindrical section of 6'8" (2.00 m.) in height, and a top section of cylindrical form but incorporating an inclined roof and ventilator unit of about 1'6" (45 cms.) in height on its low side and 2'7" (78 cms.) on its high side.

A silo in accordance with the present invention can be transported to and from a desired site by lorry or trailer, and it can easily be moved on to and from such lorry, the above described keel forming the necessary base for maintaining the silo in a stable horizontal position. The step of moving the silo into erected or horizontal positions is also easily effected by man-handling, the aforesaid tubes, rods or the like running longitudinally along the silo providing convenient hand grips and the heel of the keel providing an appropriately robust abutment during pivotal movement. If desired, however, additional hand grips may be provided for instance in the form of struts extending diagonally across the base corners of the opening in the base portion of the silo, such struts serving the additional function of stiffening the adjacent parts of the base ring of the silo.

In cases where plywood is employed in the construction of the silo such plywood may be of any thickness and include any number of plies. It may be mentioned however that for a cement silo we have found that plywood of a thickness of six millimetres is suitable for the silo proper. We further wish it to be understood that the term "plywood" as used herein is intended to include composite material made up from plies of wood or woodlike fibrous material impregnated or loaded with any desired waterproofing, preserving or strengthening material. In general, it is desirable to limit the use of metal as much as possible in the interests of lightness, but nevertheless metal sheeting may be applied to any plywood parts exposed to particular wear and/or to parts where protection greater than that afforded by paint or other coating composition is required. It is also within the scope of the present invention to make the above-described conical delivery portion from metal or metal alloy sheet material and/or to face non-metal parts of the shell of the silo with light-gauge metal or metal alloy sheeting. Thus, for instance, such sheeting may be applied to the whole of the external faces of the silo and/or to the inside face of the base portion where it is open for access to the discharge valve.

The base portion of a silo in accordance with the present invention is in general designed to give the maximum area in contact with the ground consistent with leaving the centre portion open so that any spillage of the contents of the silo falls on to the ground and does not accumulate on the frame of the silo. Any accumulation on the silo frame may be in some cases objectionable, as for instance, in the case of cement, and as a further precaution against any likelihood of objectionable accumulation the said base portion is preferably so designed as to be free from any ledges extending inwardly and in a horizontal or substantially horizontal direction.

For the purpose of still further promoting the mobility of a silo in accordance with the present invention, the aforesaid keel may be provided at its lower end with road wheels disposed for coming into contact with the ground when the silo is located in a substantially horizontal position with the keel downwardly directed, and the opposite end of such keel may be provided with a towing attachment so that the silo can be towed behind a lorry or tractor, the keel in effect serving as a mobile chassis for the silo assembly.

In order that the present invention may be well understood, one embodiment thereof will now be described with reference to the accompanying drawings in which:

Figure 5 is a broken perspective view of the ventilator unit fitted to the said silo, Figure 6 is an underside plan view of the said ventilator unit.

Figure 4:
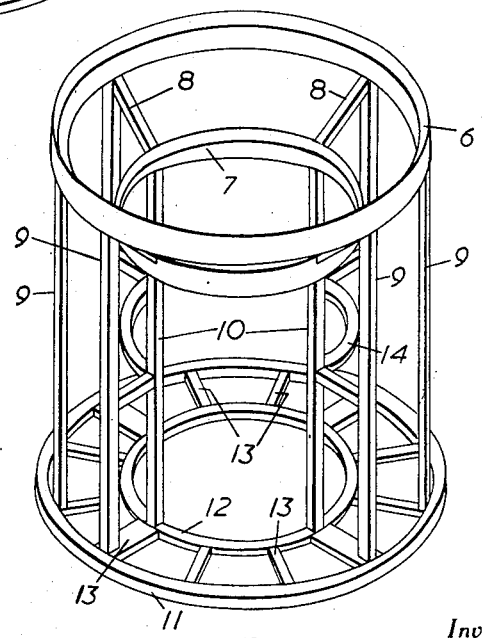
Figure 4 is a front view of the framework for the said bottom component.

Referring to the drawings, the silo includes three cylindrical components 1 and a conical component 2 together forming the silo proper, and a cylindrical component 3 forming the base unit of such silo. The cylindrical components 1 are butted against one another and the joints are covered by reinforcing rings 4, a further reinforcing ring 5 being located around the skirt of the lowermost component 1. The base unit 3 which includes the conical component 2 of the silo proper includes the framing shown in Figure 4, such framing comprising an upper ring 6 designed to support the upper periphery of the conical component 2, a lower ring 7 designed to support a lower part of the said component 2, radial inclined struts 8 extending between said rings also designed to support the wall of the said conical component and vertical posts 9 and 10 extending from the rings 6 and 7 respectively to base rings 11 and 12 which are themselves interconnected by radial struts 13. If desired there may be additional reinforcing rings, such as the ring 14 shown in Figure 4 interconnecting the vertical posts 10.

The aforesaid rings 6, 7, 11, 12 and 14 may be made from laminated timber and the rest of the said framing may be made from wood.

Figure 3:
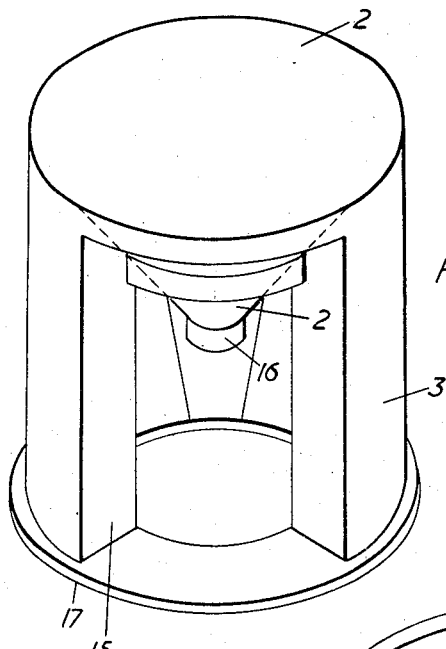
Figure 3 is a front view of the bottom component of the silo.

The walls of the aforesaid base unit are covered with sheet material as indicated in Figure 3 so as to form in effect an annular unit having an opening 15 which enables a collecting hopper to be inserted into a position for receiving say cement from the discharge aperture 16 of the silo proper. As shown in Figure 3 the lowermost rings 12 and 13 of the base unit are also shrouded in sheeting 17.

Figure 1:
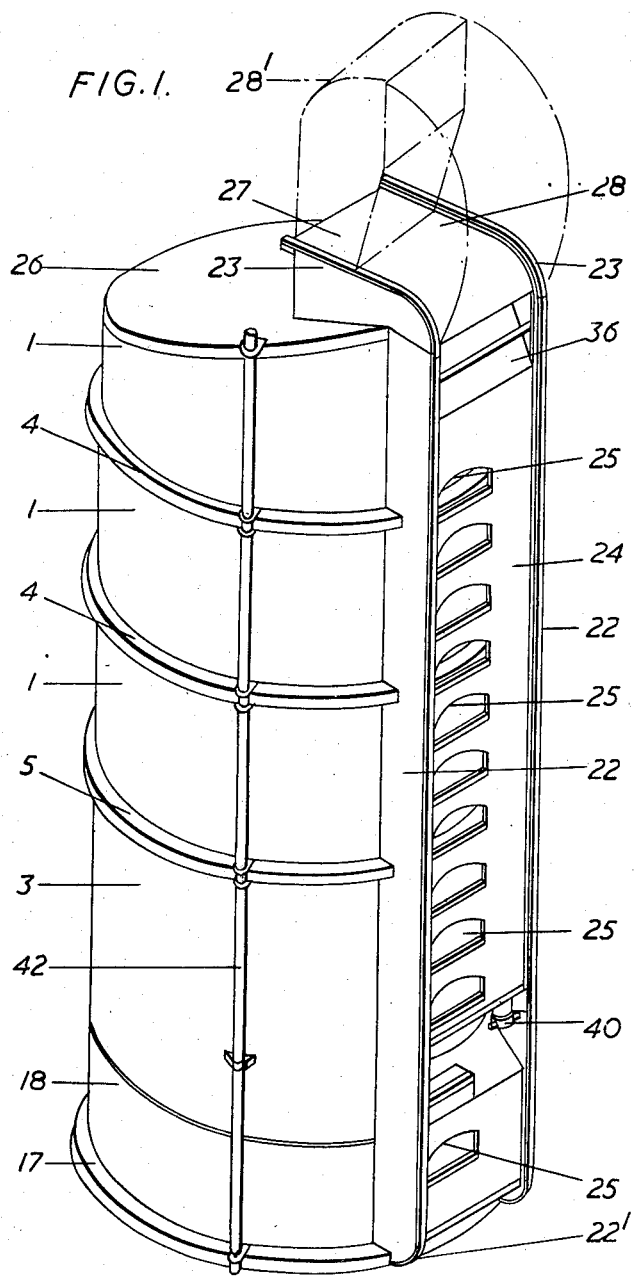
Figure 1 is a perspective view of one form of silo.

The aforesaid sheeting applied to the base unit may be of metal or it may be of plywood. In cases where the latter material is used then metal sheeting is preferably also applied to the footing of the silo and also in the form of a skirting 18 as shown in Figure 1 so as to protect those parts which are very exposed to wear.

The outlet 16 from the conical base component 2 of the silo proper may be fitted with any suitable valve and an agitator, for instance in the form of a hand operable rod 19 terminating in a ring-like head 20 (see Figure 2) and extending through a rubber mounting 21 so that it can be swung in all directions, may be provided in the neighbourhood of the discharge opening so as to oppose any tendency for arching of the material to be delivered.

The aforesaid silo is provided with a keel extending longitudinally therealong, such keel for instance consisting of two metal shod timbers 22, 22 united at their upper ends to elements 23, 23 extending to approximately the middle of the top of the silo, such elements 23, 23 being hereinafter referred to as the sideboards of the keel structure.

The elements 22, 22 of the keel are interconnected by means designed to form a ladder extending to the top of the silo. Such means may consist of ladder rungs extending between such elements but it is at present preferred to provide a sheet 24 of plywood having openings 25 therein to form foot-holds.

The silo proper is provided with a sloping roof 26 made for instance from plywood secured to a timber framing, and such roof has a rectangular opening bounded on two sides by the above-mentioned side-boards 23, 23 of the keel structure and bounded at the back by a back-board 27 interconnecting the said side-boards.

Figure 2:
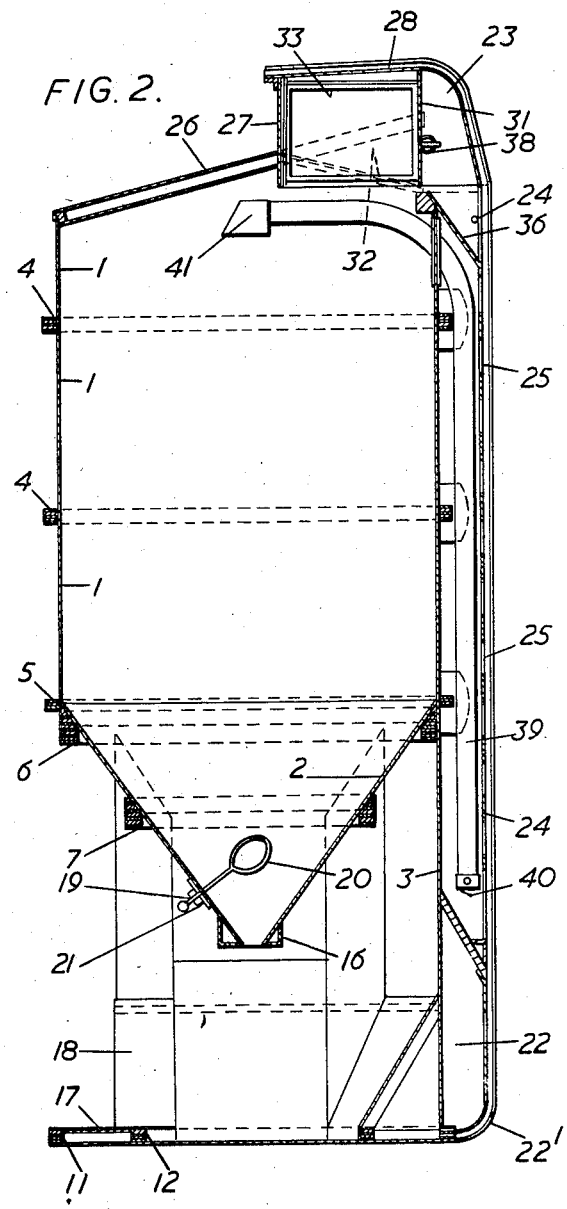
Figure 2 is a sectional elevation of such silo.

Hingedly mounted on the aforesaid back-board 27 there is a cowling and ventilator unit 28 which in the closed position shown in Figure 2 and in full lines in Figure 1 serves to shut the silo, apart from a vent hereinafter described, and in the open position shown in chain lines and designated 28 in Figure 1 allows the interior of the silo to be inspected.

Figure 7:
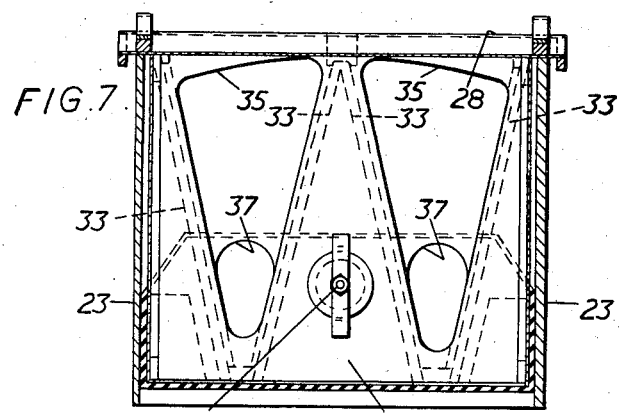
Figure 7 is a section on the line VII—VII of Figure 6.

The cowling and ventilation unit is shown in detail in Figures 5, 6 and 7, comprises in addition to the curved roofing sheet two side plates 29, 29 a rear plate 30 and a front plate 31, all of the said plates being for instance made from plywood and the front plate 31 being in alignment with the front of the opening in the silo roof 26 when the cowling and ventilator unit is closed. In order to promote air-tight contact between the lower edges of the said side, back and front plates of the ventilator unit and the upper edges of the roof components with which they make contact when such unit is closed, sealing strips 32 made of rubber or other resilient material may be fitted thereto.

Four filter frames 33 depend from the top of the filter unit 28 in W-disposition, such frames including for instance wire-mesh covered with filtering cloths, a filter cloth designated 34 being shown applied to one of the frames in Figure 5.

Air from the interior of the silo has free access to the downwardly directed faces of the filter frames and can pass therethrough into the V-like cavities thereabove, and can then flow through the openings 35, 35 in the front plate 31 of the ventilator unit into the space between the cowling of said unit and the said front plate whence it flows over the deflector plate 36 (see Figure 2) through the upper part of the keel structure.

When the silo is being charged with say cement by means of air pressure in a manner hereinafter described, the air can freely escape through the filter unit but the filters will trap the cement or at least almost all of the cement unless indeed an attempt is made to over-fill the silo and then a cloud of fine cement may be seen to emerge so giving a warning that the silo is filled. Any fine particles which do manage to pass through the filters and which collect on the upper faces of such filters will however be returned into the silo as soon as the cowling and ventilator unit is opened as openings 37, 37 are provided in the back plate 30 of the said filter unit. It will be appreciated that when the ventilator unit is closed the openings 37, 37 are sealed for instance by virtue of the rear plate 30 butting against rubber seatings secured to the back-board 27.

In order to relieve the filters of any undue pressure such as may be established if an attempt is made to over-fill the silo a spring-loaded relief valve 38 may be fitted to the front plate 31 of the filter unit, such valve when opened allowing free exit for the cement from a position below the downwardly directed faces of the filters.

The means for enabling cement or other material to be supplied to the silo under air pressure comprise a pipe 39 running within the above described keel structure and terminating at its lower end in a coupling member 40. This pipe passes through an aperture near the top of the silo and extends preferably to about the middle of the silo where it may terminate in a deflector hood 41 which tends to direct the cement downwardly for good and quick distribution in such silo.

Figure 8:
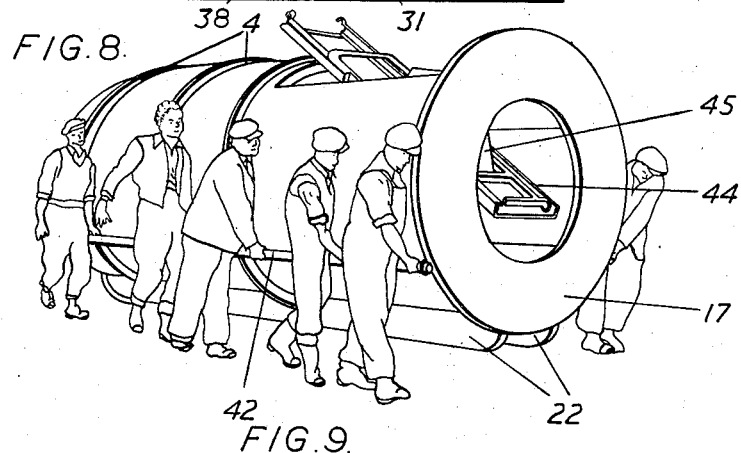
Figure 8 illustrates how the silo can be man-handled.

The above described silo also preferably includes rails 42, 42 which are provided for the purpose of facilitating man-handling of such silo, and there is illustrated in Figure 8 how the silo can be carried by man-power into a desired position. For transport purposes the silo can however be easily located on a lorry and this is diagrammatically illustrated in Figure 9 where a lorry is designated by numeral 43. It will be appreciated that when this silo is horizontally disposed, e. g. resting on the ground or on a transporting vehicle, the keel is downwardly disposed and operates in the nature of a backbone reinforcing the whole silo and opposing any rolling thereof. Such keel also appropriately reinforces the silo whilst it is being swung into its erected condition and in order to facilitate this movement the lower end of the keel may be radiused as shown at 22' in the drawings.

Figure 9:
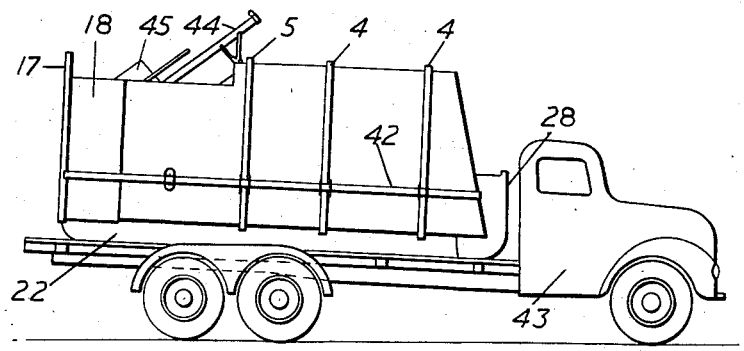
Figure 9 illustrates how such silo can be transported on a lorry.

The silo shown in Figures 8 and 9 is identical with that already described excepting that there is shown mounted in the front opening of the silo a pivoted trackway 44 along which a hopper 45 can travel, such trackway when moved into an operative horizontal position enabling the hopper 45 to be moved under the silo discharge 16 for receiving a charge of cement and then to a delivery zone for discharging such cement for use.

Whilst one specific embodiment of a silo in accordance with the present invention has been hereinbefore described it is to be understood that the specific details may be varied or modified without departing from the scope of such invention. Thus the body of the silo may be built up from any desired number of cylindrical components and the structure may be reinforced by various stays additional to those above described.

I claim:

1. A light-weight, unitary silo adapted to be transported from place to place for temporary storing and dispensing of powdery material such as cement, said silo having a container portion comprising an assembly of cylindrical units made from plywood secured together in coaxial relationship, reinforcing rings secured to said units and covering the joints between adjacent units, a roof atop the uppermost cylindrical unit, a base unit below and secured to and supporting said assembly of cylindrical units when in an upright position, a keel extending longitudinally along said base and assembly of cylindrical units and secured thereto for reinforcing and stabilizing the same, said keel also serving as a base on which to rest said silo structure in a horizontal yet stable position for purposes of transport, an inlet pipe extending upwardly along said cylindrical assembly and terminating within the upper part of the container portion of said silo through which said container portion can be charged with the material by pneumatic means, a valve controlled discharge opening located at the lower end of said container portion spaced from the bottom of said silo to permit discharge of the material by gravity, and a movable cover unit permitting access to the interior of said silo through said roof, said cover unit providing a vent for the escape of air employed for charging said container portion and further providing a filter for preventing the material from escaping with the said air.

2. A silo as defined in claim 1 wherein said keel is comprised of two spaced members extending longitudinally along said silo and interconnected by sheet material in which are formed a series of longitudinally spaced openings serving as foot-holds by which to climb up the silo.

3. A silo as defined in claim 2 wherein the sheet material interconnecting said longitudinally extending spaced members is plywood and the treat portions of said openings are shod with metal.

4. A silo as defined in claim 1 wherein said inlet pipe extends longitudinally along and is enclosed by said keel.

5. A silo as defined in claim 1 and which further includes hand members secured to and extending longitudinally along said silo parallel to and at opposite sides of said keel serving to facilitate man-handling of said silo.

6. A silo as defined in claim 1 wherein said cover unit for venting the upper end of said silo includes an assembly of inclined filter frames having their lower surfaces exposed to an opening in said roof.

7. A silo as defined in claim 6 wherein four of said filter frames are provided, said frames being arranged in a W-formation.

8. A silo as defined in claim 6 wherein said assembly of filter frames is bounded by side, back and front plates, said front plate being provided with openings in a position for communication with the space above the filter surfaces, said openings permitting air to escape.

9. A silo as defined in claim 8 wherein said rear plate is also provided with openings enabling any solid materials collecting above said filter frames to be discharged by rearward tilting movement of said cover unit, said openings being sealed when said cover unit occupies its closed position by abutment of said rear plate against rubber seatings secured to a back-board fitted to said roof.

References Cited in the file of this patent

UNITED STATES PATENTS

| | | |
|---|---|---|
| 2,254,448 | Pursel | Sept. 2, 1941 |
| 2,361,272 | Covey | Oct. 24, 1944 |
| 2,417,979 | Gilmore | Mar. 25, 1947 |
| 2,551,216 | Martin | May 1, 1951 |
| 2,639,862 | Watts | May 26, 1953 |
| 2,685,964 | Brown | Aug. 10, 1954 |

FOREIGN PATENTS

| | | |
|---|---|---|
| 693,871 | Germany | July 20, 1940 |
| 475,385 | Italy | Oct. 24, 1952 |